(12) United States Patent
Armentrout et al.

(10) Patent No.: US 7,889,384 B2
(45) Date of Patent: Feb. 15, 2011

(54) METHOD FOR MORE EFFICIENTLY MANAGING COMPLEX PAYLOADS IN A POINT OF SALE SYSTEM

(75) Inventors: Gerald H. Armentrout, Raleigh, NC (US); Phuc K. Do, Morrisville, NC (US); Bobby R. Hargett, Jr., Raleigh, NC (US); E. Michael Maximilien, Raleigh, NC (US)

(73) Assignee: International Business Machines Corporation, Armonk, NY (US)

( * ) Notice: Subject to any disclaimer, the term of this patent is extended or adjusted under 35 U.S.C. 154(b) by 1231 days.

(21) Appl. No.: 10/860,347

(22) Filed: Jun. 3, 2004

(65) Prior Publication Data

US 2005/0273391 A1    Dec. 8, 2005

(51) Int. Cl.
*H04N 1/60* (2006.01)
*G06K 15/00* (2006.01)
*G06K 15/02* (2006.01)
*G06Q 20/00* (2006.01)

(52) U.S. Cl. .................... 358/1.9; 358/1.2; 358/2.1; 705/16

(58) Field of Classification Search ............ 705/16
See application file for complete search history.

(56) References Cited

U.S. PATENT DOCUMENTS

| | | | | |
|---|---|---|---|---|
| 4,651,278 A | * | 3/1987 | Herzog et al. | 358/1.18 |
| 5,544,287 A | * | 8/1996 | Roth | 358/1.15 |
| 5,592,683 A | * | 1/1997 | Chen et al. | 710/52 |
| 2002/0101601 A1 | | 8/2002 | Parrish et al. | |
| 2002/0142720 A1 | | 10/2002 | Russell et al. | |
| 2005/0273391 A1 | * | 12/2005 | Armentrout et al. | 705/16 |

FOREIGN PATENT DOCUMENTS

JP    2002091717 A    3/2002

* cited by examiner

*Primary Examiner*—F. Ryan Zeender
*Assistant Examiner*—Fahd A Obeid
(74) *Attorney, Agent, or Firm*—Jason O. Piche; Jeffrey L. Streets

(57) ABSTRACT

A method for managing complex payload using on a point of sale (POS) printer is described. The complex payload includes a plurality of commands. The method includes organizing at least a portion of the commands into a single entity. The single entity corresponds to more than one command, though need not contain all of the commands. The method also includes providing a payload identifier corresponding to the single entity. The payload identifier indicates a correspondence between the commands for the single entity and the single entity.

16 Claims, 4 Drawing Sheets

METHOD FOR MORE EFFICIENTLY MANAGING COMPLEX PAYLOADS IN A POINT OF SALE SYSTEM

FIELD OF THE INVENTION

The present invention relates to point of sale systems, and more particularly to a method and system for more efficiently performing complex operations using a point of sale printer.

BACKGROUND OF THE INVENTION

Point of sale (POS) systems are of increasing use in the marketplace. FIG. 1 depicts a conventional POS system 10. The conventional POS system 10 includes a conventional POS host 20 having a conventional POS host application 22 and conventional UPOS printer drivers 24. The conventional POS system 10 also includes a conventional POS printer 30 having conventional firmware 32. Often, the conventional POS host application 22 is a conventional standard host application 22. A standard interface used in POS systems is Unified POS (UPOS). The UPOS interface allows host applications to be used on multiple UPOS compliant POS systems. Consequently, the conventional standard host application 22 may be a conventional UPOS host application 22.

During operation of the conventional POS system 10, various items are printed on the conventional POS printer 30. In order to do so, a complex payload is typically provided the conventional POS printer 30. The complex payload includes data as well as various commands such as bold face for a particular column, normal face for the next column, an alternate font for the third column, and other analogous commands. The complex payload thus provides the data and manages how the data is to be printed. The commands are provided from the UPOS host application 22 to the conventional UPOS printer drivers 24. Although the conventional UPOS host application 22 is compliant with the standard interface UPOS, the conventional POS printer 30 typically is not. Instead, the conventional POS printer 30 is a native printer capable of understanding its own, native, set of commands. Consequently, a conventional method for printing the complex payload including commands is used.

FIG. 2 depicts a conventional method 50 for printing a complex payload. The method 50 is described in the context of the conventional POS system 10. The conventional UPOS printer drivers 24, therefore, map the commands provided by the UPOS host application 22 to the native commands of the conventional POS printer 30. The complex payload, including commands for the conventional POS printer 30, is provided in a UPOS format from the UPOS host to the conventional UPOS printer drivers 24, via step 52. The conventional UPOS printer drivers 24 map the commands 30 to native commands with which the conventional POS printer 30 is compatible, via step 54. The conventional UPOS printer drivers 24 provide the complex payload to the conventional POS printer 30, via step 56. The conventional UPOS printer drivers 24 also individually track each of the commands provided to the printer, via step 58. For example, in step 58, the conventional UPOS printer drivers 24 individually determine whether each command has reached the conventional POS printer 30, whether any errors occurred for each command, and whether each command has been processed by the conventional POS printer 30. Furthermore, the conventional UPOS printer drivers 24 identify each command with a particular complex payload through step 58. Thus, the conventional UPOS printer drivers 24, and thus the conventional POS system 10, can determine whether the complex payload was processed correctly. Once it is confirmed that the last command associated with a particular complex payload has been processed without error, the conventional UPOS printer drivers 24 can destroy reference to the complex payload in the conventional UPOS printer drivers 24, via step 60. Typically, step 60 takes the form of removing a linked list including the commands that is associated with the complex payload.

Although the conventional method 50 and POS system 10 function, one of ordinary skill in the art will readily recognize that the management of complex payloads is inefficient and slow. In particular, the conventional UPOS printer drivers 24 must individually track each command to determine to which each complex payload the command belongs. For example, not only is the data being printed tracked, but the status of each command is individually tracked as the complex payload is sent to and processed by the conventional POS printer 30. Furthermore, in order to remove reference to the complex payload that has been processed, the conventional UPOS printer drivers 24 typically traverse the linked list of commands associated with the complex payload. Such a process can consume a significant amount of processing resources for the conventional POS system 10. In addition, the process of mapping the UPOS commands to the native commands is complex and likely to introduce errors into the complex payload. In the event of an error, the conventional UPOS printer drivers 24 locate the start of the reference to the complex payload and resend the entire complex payload. The process of locating the start of the references to complex payload in the driver can be difficult. Thus, accounting for errors can be more difficult.

Accordingly, what is needed is a system and method for more efficiently managing complex payloads in a POS system. The present invention addresses such a need.

SUMMARY OF THE INVENTION

The present invention provides a method and system for managing complex payload using on a point of sale (POS) printer. The complex payload includes a plurality of commands. The method and system include organizing at least a portion of the plurality of commands into a single entity. A particular entity includes more than one of the commands, but need not include all of the commands in the complex payload. The method and system also include providing a payload identifier corresponding to the single entity. The payload identifier indicates a correspondence between the commands for the single entity and the single entity.

According to the system and method disclosed herein, the present invention provides a method and system that allow complex operations to be more efficiently managed by a point of sale system, particularly a point of sale system including a Unified Point of Sale host application and a native printer.

DETAILED DESCRIPTION OF THE INVENTION

The present invention relates to an improvement in point of sale (POS) systems. The following description is presented to enable one of ordinary skill in the art to make and use the invention and is provided in the context of a patent application and its requirements. Various modifications to the preferred embodiment will be readily apparent to those skilled in the art and the generic principles herein may be applied to other embodiments. Thus, the present invention is not intended to be limited to the embodiment shown, but is to be accorded the widest scope consistent with the principles and features described herein.

The present invention provides a method and system for managing complex payload using on a point of sale (POS) printer. The complex payload includes a plurality of commands. The method and system include organizing at least a portion of the plurality of commands into a single entity. A single entity includes more than one command, but need not include all of the commands in the complex payload. More than one entity may thus be provided for a particular complex payload. The method and system also include providing a payload identifier corresponding to the single entity. The payload identifier indicates a correspondence between the commands for the single entity and the single entity.

The present invention will be described in terms of a particular standard interface, unified POS (UPOS), and a POS system having particular components. However, one of ordinary skill in the art will readily recognize that this method and system will operate effectively for other standard interfaces as well as POS systems having different and/or additional components.

Figure 3A:
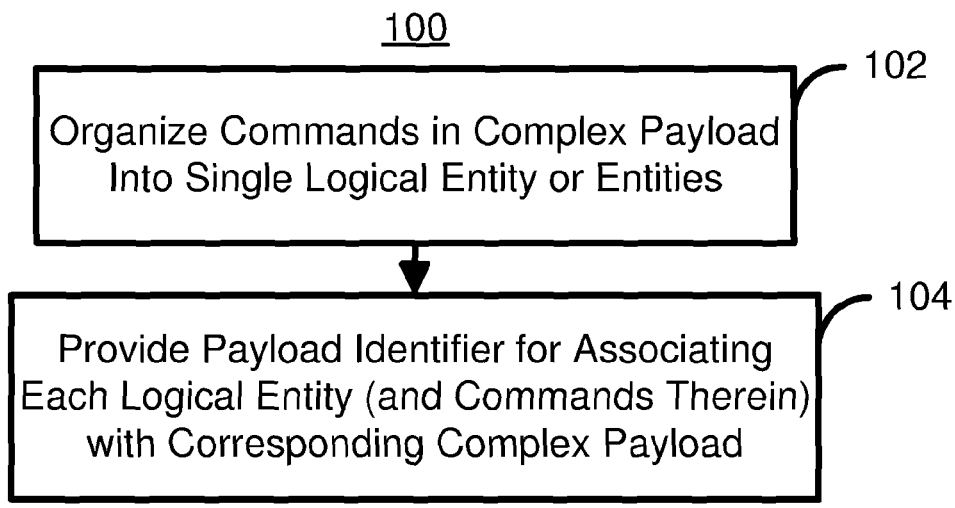
FIG. 3A is a high-level flow chart depicting one embodiment of a method for managing complex payloads in a point of sale system.

To more particularly illustrate the method and system in accordance with the present invention, refer now to FIG. 3A, depicting a high-level flow chart of one embodiment of a method 100 for managing complex payloads in a POS system. As discussed above, a complex payload is a payload that includes commands and is for a printer of a POS system. Some portion of the commands is organized into a single logical entity, via step 102. The single logical entity includes multiple commands. In some instances, the single entity may include all of the commands in the complex payload. In other instances, the commands in the complex payload may be spread over multiple entities. In such a case, step 102 would be performed several times for the complex payload.

A payload identifier is provided for the single entity, via step 104. The payload identifier provides an identification for the complex payload and associates the single entity, and thus the commands therein, with the complex payload. In one embodiment, the payload identifier is a logical delimiter that is placed at and marks the end of the single entity. In an alternate embodiment, the logical delimiter may be placed at the start of the single entity or at another location. The payload identifier may also be optimized to ensure that it has a small size. For example, the payload identifier may simply be a printer command which causes the printer to which the single entity is sent to echo back to the source without further processing. The identifier which associates the single entity with the payload can thus be small, for example between one and four bytes, allowing the payload identifier to be efficiently constructed and used.

Figure 3B:
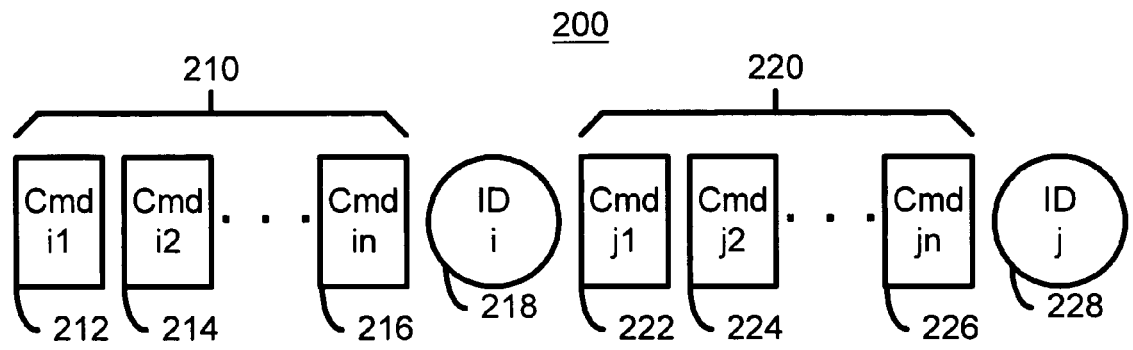
FIG. 3B is a block diagram depicting one embodiment in accordance with the present invention of a series of complex payloads.

FIG. 3B is a block diagram depicting one embodiment in accordance with the present invention of a series 200 of complex payloads organized into single entities 210 and 220. Referring to FIGS. 3A and 3B, the single entity 210 corresponds to payload i and includes commands i1 through in. The payload identifier 218 for the single entity 210 is also shown. Similarly, the single entity 220 corresponds to payload j and includes commands j1 through jm. The payload identifier 228 for the single entity 220 is also shown. Thus, multiple commands are organized into entities based upon the payload. Note that in an alternate embodiment, the single entities 210 and 220 may correspond to the same payload. In such a case, the payload identifiers 218 and 228 would indicate that both entities 210 and 220 are related to a single payload. Thus, in some instances, all of the commands for a particular complex payload are included in a single entity 210 or 220. Stated differently, a single entity 210 or 220 corresponds to a single payload. However, in another embodiment, some or all complex payloads may be composites, corresponding to multiple entities. In such a case, the commands for the complex payload may be a composite of the commands in the entities 210 and 220.

Using the method 100, the complex payload can be more efficiently managed. In particular, a system in accordance with the present invention, described below, need only track the single entities 210 and 220, instead of the individual commands 212, 214, 216, 222, 224, 226. As a result, the tracking of the commands 212, 214, 216, 222, 224, and 226 is simplified and requires less processing. Similarly, error recovery is also simplified. If an error occurs in one or more of the commands 212, 214, 216, 222, 224, or 226 of the single entities 210 and 220, the entire entity 210 or 220 is considered to have an error. If an error occurs in printing an entity 210 or 220, the entire entity 210 or 220 is resent to the printer. To do so, the payload identifier 218 or 228 is located and the entire entity 210 or 220 is resent. Thus, individual commands 212, 214, 216, 222, 224, and 226 need not be found individually and resent. Error recovery is thereby simplified. In addition, because UPOS requires that a complex payload must be resent in its entirety, the error recovery described above comports with the UPOS standard. Moreover, because tracking and error recovery is simplified, the components performing these functions (described below) may also be simplified.

Figure 1:
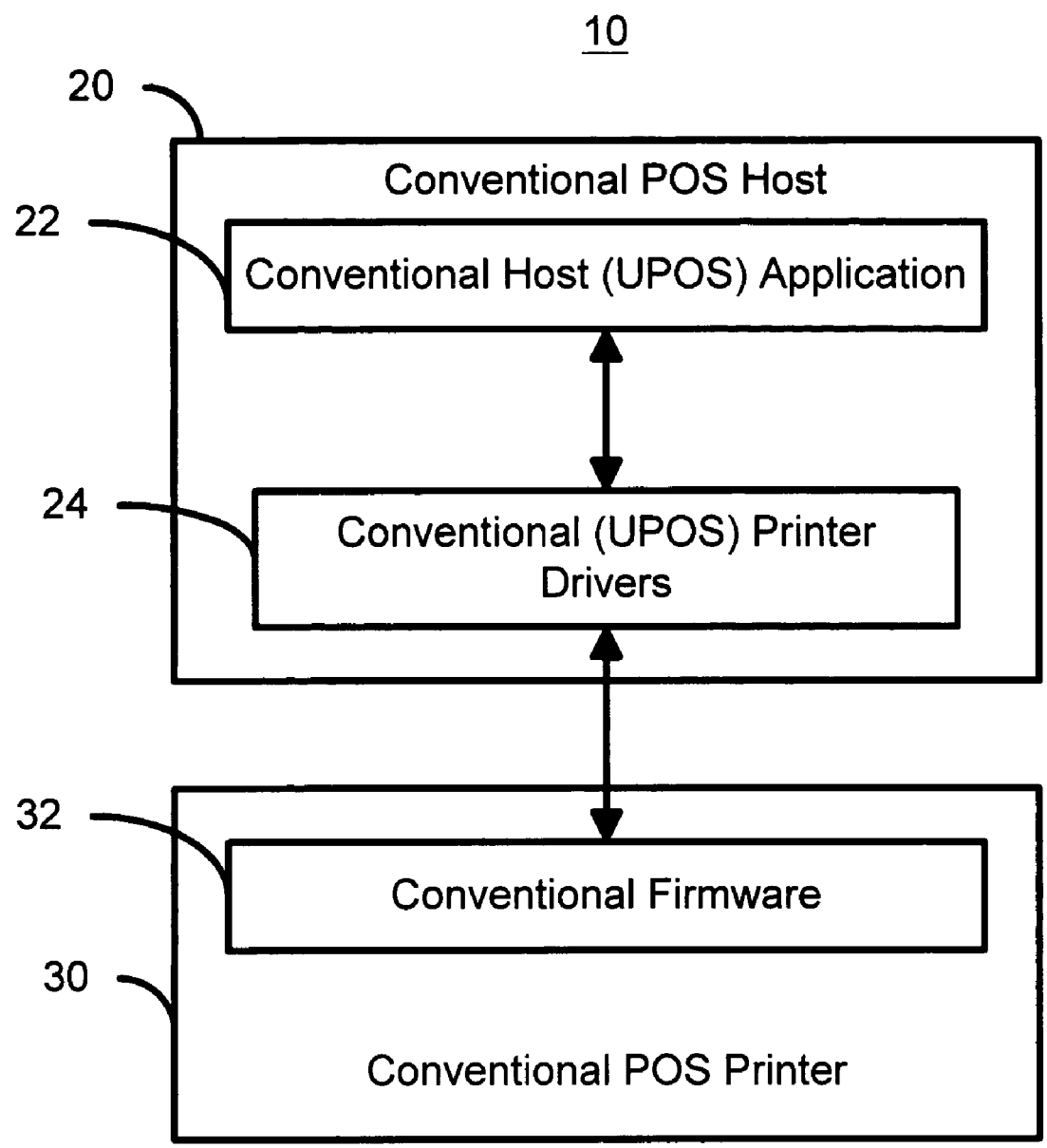
FIG. 1 is a diagram of a conventional point of sale system including at least one application and a native printer.
Figure 2:
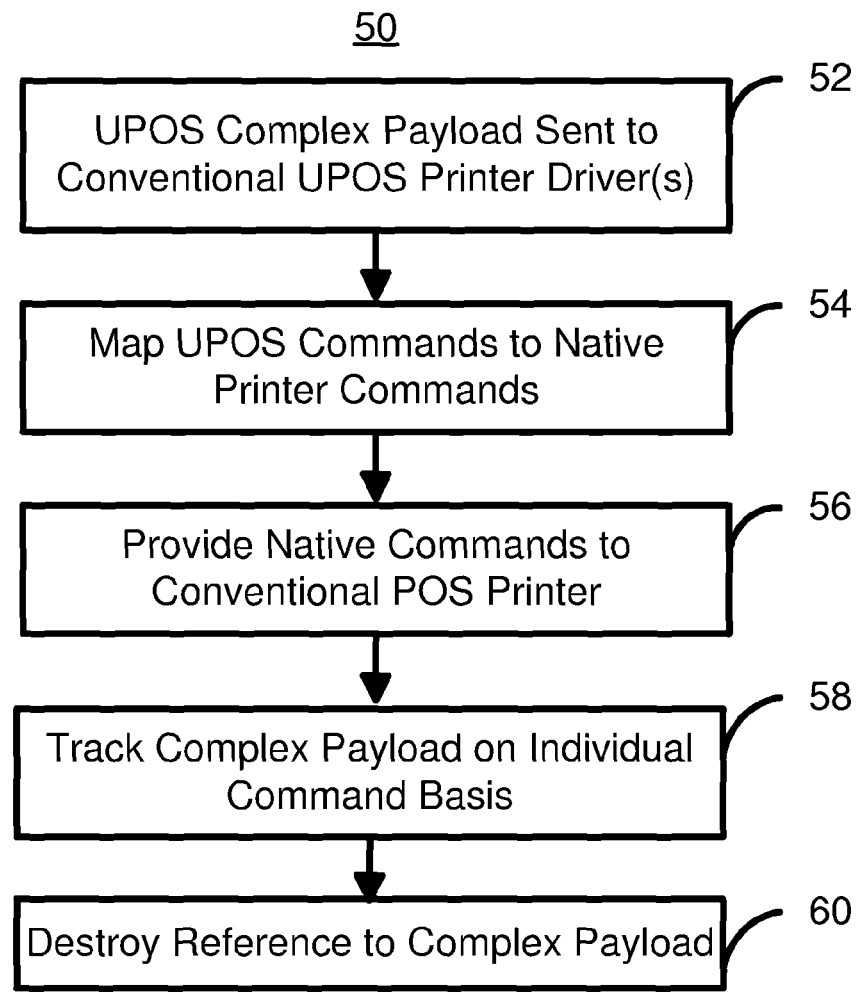
FIG. 2 is a high-level flow chart depicting a conventional method for managing complex payloads in a point of sale system.
Figure 4:
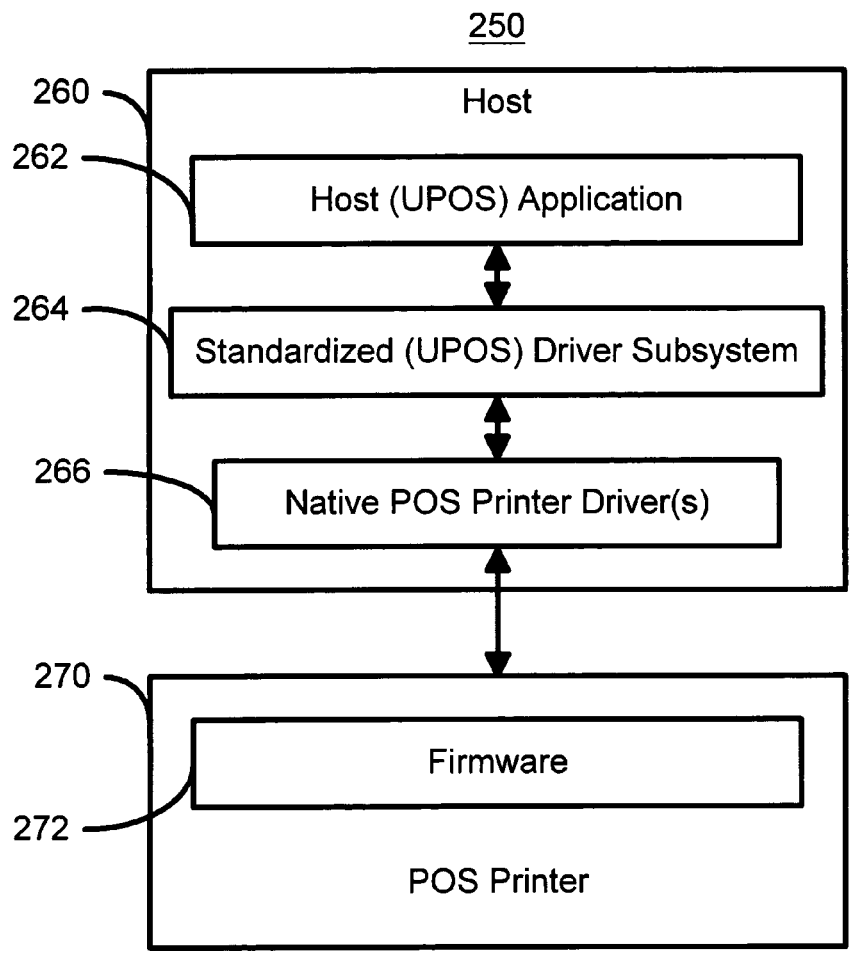
FIG. 4 is a block diagram depicting one embodiment of a system in accordance with the present invention that manages complex payloads in a point of sale system.

FIG. 4 is a block diagram depicting one embodiment of a system 250 in accordance with the present invention that manages complex payloads in a POS system. For clarity, other potions of the system 250, as well as the POS system in which it is contained, are not depicted. The system 250 is also described in the context of the method 100 and the payload stream 200 depicted in FIGS. 3A and 3B, respectively. Referring to FIGS. 3A, 3B, and 4, the system 250 includes a host 260 and a POS printer 270. The host 260 includes a host application 262 having a standard interface. The host application is preferably a UPOS application 262. The host 260 also includes a UPOS driver subsystem 264 and an optional native POS printer driver(s) 266. The UPOS host application 262 is analogous to the conventional UPOS host application 22 depicted in FIG. 1. The UPOS driver subsystem 264 may includes printer drivers that communicate with the native POS printer driver(s) 266 and are to an extent analogous to the conventional printer drivers 24 depicted in FIG. 1. For example, the UPOS driver subsystem 266 may be used to convert commands between UPOS and the native commands of the printer 270. However, in an alternate embodiment, the native POS printer driver(s) 266 may perform this function. However, referring back to FIG. 4, the UPOS driver subsystem 264 may need not perform tracking of commands, error recovery, or other functions performed by the native POS printer driver(s) 266. The POS printer 270 includes firmware 272 used in communicating with the host 260. To an extent, the firmware 272 is, therefore, analogous to the firmware 32 depicted in FIG. 1. However, referring back to FIGS. 3A, 3B, and 4, the firmware 272 may be simplified. As discussed below.

In operation, the native POS printer drivers(s) 266 perform the method 100. In particular, the native POS printer driver(s) 266 organizes the commands for the complex entity into one or more single entities and provides identifiers for the single entities. In addition, the native POS printer driver(s) 266 provide the complex payloads, such as those depicted in FIG. 3B, to the POS printer 270. The native POS printer driver(s) 266 also track the entities 210 and 220 and perform error recovery on the basis of the entities 210 and 220 rather than on the individual commands 212, 214, 216, 222, 224, and 226 within the entities 210 and 220. The native POS printer driver(s) 266 may also optimize the bandwidth of the payloads provided to the POS printer 270. Moreover, the native POS printer driver(s) 266 preferably formulate the payload identifiers 218 and 228 such that their size is reduced or minimized to reduce the bandwidth required by the payloads 200.

The firmware 272 receives the entities 210 and 220, as well as any other data in the corresponding complex payload(s). The firmware 272 also aids in tracking the complex payloads on the basis of the entities 210 and 220. For example, in one embodiment, receiving the payload identifiers 218 and 228 causes the firmware 272 to echo back to the native POS printer driver(s) 266, indicating that the entities 210 and 220 have been received. If there is an error in receiving the entities 210 and 220 or in processing any of the commands 212, 214, 216, 222, 224, and 226, the firmware 272 indicates the entities 210 or 220 which were subject to error(s). The printer 270 can thus receive and process the complex payloads, as well as providing the appropriate output based on the commands 212, 214, 216, 222, 224, and 226 for the complex payload(s).

Because the native POS printer driver(s) 266 can track payloads and perform error recovery on the basis of the entities 210 and 220, rather than the individual commands 212, 214, 216, 222, 224, and 226, the native POS printer driver(s) 266 may have a simpler design. Similarly, because the firmware 272 can track payloads and perform error recovery on the basis of the entities 210 and 220, rather than the individual commands 212, 214, 216, 222, 224, and 226, the firmware 272 may have a simpler design. The native POS printer driver(s) 266 may also optimize the size and type of the payload identifiers 218 and 228 and thus reduce the resources consumed by sending the complex payload to the printer 270.

Figure 5:
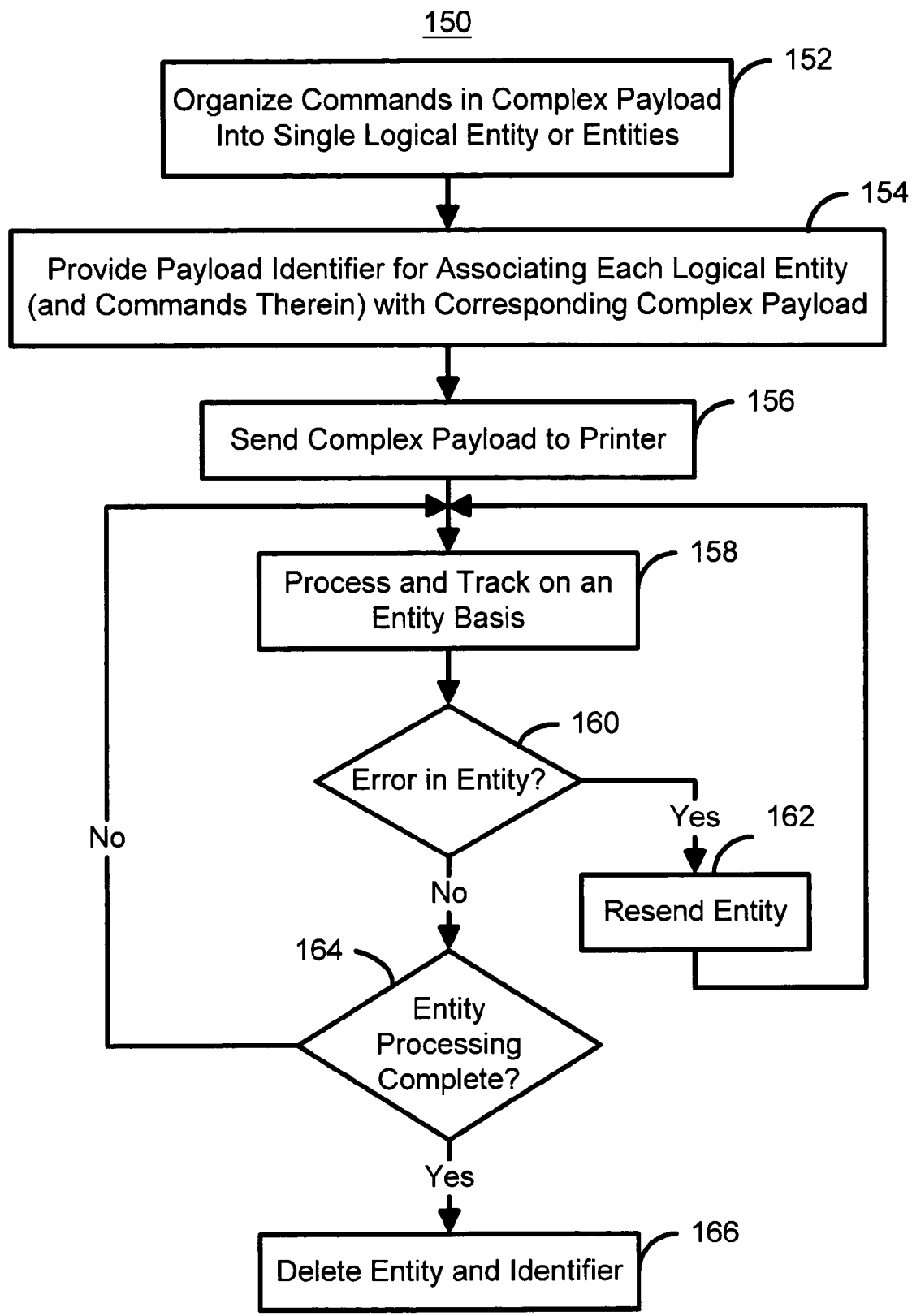
FIG. 5 is a more detailed flow chart depicting a one embodiment of a method for managing complex payloads in a point of sale system.

FIG. 5 is a more detailed flow chart depicting a one embodiment of a method 150 for managing complex payloads in a point of sale system. The method 150 is described in the context of the system 250 depicted in FIG. 4 and the stream of entities 200 depicted in FIG. 3B. However, nothing prevents the method 150 from being implemented using another system. Referring to FIGS. 3B, 4 and 5, some portion of the commands is organized into a single logical entity, via step 152. The single logical entity includes multiple commands. In some instances, the single entity may include all of the commands in the complex payload. In other instances, the commands in the complex payload may be spread over multiple entities. In such a case, step 152 would be performed several times for the complex payload. Step 152 is thus analogous to the step 102 of the method 100 depicted in FIG. 3A. Referring back to FIGS. 3B, 4 and 5, the step 152 may be performed by the native POS printer driver(s) 266.

A payload identifier is provided for the single entity, via step 154. The payload identifier provides an identification for the complex payload and associates the single entity, and thus the commands therein, with the complex payload. In one embodiment, the payload identifier is a logical delimiter that is placed at and marks the end of the single entity. In an alternate embodiment, the logical delimiter may be placed at the start of the single entity or at another location. The payload identifier may also be optimized to ensure that it has a small size. For example, the payload identifier may simply be a printer command which causes the printer to which the single entity is sent to echo back to the source of the without further processing. The identifier which associates the single entity with the payload can thus be small, for example between one and four bytes, allowing the payload identifier to be efficiently constructed and used. Step 154 is thus analogous to the step 104 of the method 100 depicted in FIG. 3A. Referring back to FIGS. 3B, 4 and 5, the step 154 may be performed by the native POS printer driver(s) 266.

The complex payload, including the entity 210 and/or 220, is sent to the POS printer 270, via step 156. The native POS printer driver 266 preferably sends the complex payload, while the firmware 272 preferably receives the complex payload. The complex payload processed by the printer and is tracked on the basis of the single entities 210 and/or 220, via step 158. Processing the complex payload can include performing operations corresponding to the commands 212, 214, 216, 222, 224, and 226 that are not erroneous. For example, such operations may include placing particular columns or other sections in boldface, using the appropriate font, or other printing operations. Tracking is preferably performed through communication between the native POS printer driver(s) 266 and the firmware 272. For example, error detection and recovery is described in connection with the method 150. It is determined whether an error has occurred, via step 160. This determination could take a variety of forms. If the entities have not been received by the firmware 272, step 160 could include the native POS printer driver(s) 266 timing out when the firmware 272 has not echoed the payload identifiers 218 and 228 back to the native POS printer driver(s) 266 within the required time interval. An error may also occur in processing the complex payload. For example, one or more of the commands 212, 214, 216, 222, 224, or 226 may have been incorrectly mapped from UPOS to the native commands for the POS printer 270. In such a case, an error message for the entity 210 or 220 containing the erroneous command 212, 214, 216, 222, 224, or 226 may be provided to the native POS printer driver(s) 266, preferably by the firmware 272. In the case of all errors, however, the determinations are made based upon whether the entire entity 210 or 220 is error free.

If it is determined in step 160 that an error exists for a particular entity 210 or 220, then the entire entity 210 or 220, respectively, is resent, via step 162. In a preferred embodiment, step 162 is performed by the native POS printer driver(s) 266 locating the corresponding payload identifier 218 or 228 and resending the appropriate payload including entities 210 and/or 220, respectively. It may be determined whether processing of the complex payload including entity 210 and/or 220 is completed, via step 270. If not, processing and entity-based tracking of the complex payload continues in step 158. If the complex payload had completed processing, then it is deleted from the native POS printer driver(s) 266, via step 166. Step 166 may include locating the payload identifiers 218 and 228 for the entities 210 and 220, respectively, that have completed processing and deleting the corresponding entities 210 and 220 from the memory of the native POS printer driver 266. The method 150 may be repeated for other complex payloads.

Using the method 150, the complex payload can be more efficiently managed. In particular, only the single entities 210 and 220, instead of the individual commands 212, 214, 216, 222, 224, 226, are tracked. As a result, the tracking of the commands 212, 214, 216, 222, 224, and 226 is simplified and requires less processing. For example, deleting the entities 210 and 220 is simplified because only one payload identifier 218 and 220, respectively, for the entity 210 and 220, respectively, need be located. This is in contrast to a conventional system which would locate each of the commands 212, 214, 216, 222, 224, and 226. Similarly, error recovery is also simplified. If an error occurs in one or more of the commands 212, 214, 216, 222, 224, or 226 of the single entities 210 and 220, the entire entity 210 or 220 is determined to have an error in step 160. If an error occurs in printing an entity 210 or 220, the entire entity 210 or 220 is resent to the printer in step 162. To do so, the payload identifier 218 or 228 is located and the entire entity 210 or 220 is resent. Thus, individual commands 212, 214, 216, 222, 224, and 226 need not be found individually and resent. Error recovery is thereby simplified. In addition, because UPOS requires that a complex payload must be resent in its entirety, the error recovery described above comports with the UPOS standard. Moreover, because tracking and error recovery is simplified, the components performing these functions (described below) may also be simplified.

A method and system has been disclosed for more efficiently managing complex payloads in a point of sale system. Software written according to the present invention is to be stored in some form of computer-readable medium, such as memory, CD-ROM or transmitted over a network, and executed by a processor. Consequently, a computer-readable medium is intended to include a computer readable signal which, for example, may be transmitted over a network. Although the present invention has been described in accordance with the embodiments shown, one of ordinary skill in the art will readily recognize that there could be variations to the embodiments and those variations would be within the spirit and scope of the present invention. Accordingly, many modifications may be made by one of ordinary skill in the art without departing from the spirit and scope of the appended claims.

What is claimed is:

1. A method for managing complex payload on a point of sale (POS) printer, the complex payload including a plurality of commands from a Unified POS application running on a host, the method comprising:
   converting on the host the plurality of commands of the complex payload from a Unified POS format to a native POS format used by the POS printer, wherein each of the plurality of the commands is usable as an individual command by the POS printer;
   using at least one native POS printer driver on the host to organize at least a portion of the plurality of commands in the native POS format into a single entity, the at least the portion of the plurality of commands containing more than one of the plurality of commands;
   using the at least one native POS printer driver on the host to provide a payload identifier corresponding to the single entity, the payload identifier indicating a correspondence between the at least the portion of the plurality of commands and the single entity;
   sending the single entity from the at least one native POS printer driver to the POS printer, wherein the POS printer is not a Unified POS printer, wherein a plurality of operations are performed at the POS printer corresponding to the at least the portion of the plurality of commands; and
   using the at least one native POS printer driver to track the at least the portion of the plurality of commands by only tracking the single entity instead of individually tracking the commands of the at least the portion of plurality of commands, wherein the tracking the single entity includes
      determining whether the single entity has reached and been processed by the POS printer, as assisted by an indication from the POS printer to the at least one native POS printer driver on the host that the single entity has been received and processed, and
      determining that an error has occurred for the single entity by determining whether one or more errors have occurred for any of the plurality of commands in the single entity at the POS printer, as assisted by an indication from the POS printer to the at least one native POS printer driver on the host that the single entity has the error,
      wherein in response to determining the error has occurred for the single entity, resending the single entity to the POS printer without locating one or more individual commands in the at least the portion of the plurality of commands that have the one or more errors.

2. The method of claim 1 wherein the payload identifier is provided to the POS printer immediately before or after the single entity is provided to the POS printer, wherein the payload identifier is a logical delimiter marking a start of a first command of the at least the portion of the plurality of commands or marking an end of a last command of the at least the portion of the plurality of commands.

3. The method of claim 1 wherein the payload identifier further includes an identification for the single entity.

4. The method of claim 1 further comprising:
   deleting the single entity after the performing of the plurality of operations corresponding to the at least the portion of the plurality of commands, the deleting performed without locating each of the commands in the at least the portion of the plurality of commands.

5. The method of claim 1 further comprising:
   organizing at least a second portion of the plurality of commands into a second single entity, the at least the second portion of the plurality of commands containing more than one remaining command of the plurality of commands;
   providing a second payload identifier corresponding to the second single entity, the payload identifier indicating a correspondence between the at least the second portion of the plurality of commands and the second single entity; and
   sending the second single entity from the at least one native POS printer driver to the POS printer.

6. The method of claim 1 wherein the payload identifier includes a printer command to be simply echoed by the POS printer.

7. A computer-readable medium storing a program for managing complex payload on a point of sale (POS) printer, the complex payload including a plurality of commands from a Unified POS application running on a host, the program including instructions for:
   converting on the host the plurality of commands of the complex payload from a Unified POS format to a native POS format used by the POS printer, wherein each of the plurality of the commands is usable as an individual command by the POS printer;

using at least one native POS printer driver on the host to organize at least a portion of the plurality of commands in the native POS format into a single entity, the at least the portion of the plurality of commands containing more than one of the plurality of commands;

using the at least one native POS printer driver on the host to provide a payload identifier corresponding to the single entity, the payload identifier indicating a correspondence between the at least the portion of the plurality of commands and the single entity;

sending the single entity from the at least one native POS printer driver to the POS printer, wherein the POS printer is not a Unified POS printer, wherein a plurality of operations are performed at the POS printer corresponding to the at least the portion of the plurality of commands; and using the at least one native POS printer driver to track the at least the portion of the plurality of commands by only tracking the single entity instead of individually tracking the commands of the at least the portion of plurality of commands, wherein the tracking the single entity includes determining whether the single entity has reached and been processed by the POS printer, as assisted by an indication from the POS printer to the at least one native POS printer driver on the host that the single entity has been received and processed, and determining that an error has occurred for the single entity by determining whether one or more errors have occurred for any of the plurality of commands in the single entity at the POS printer, as assisted by an indication from the POS printer to the at least one native POS printer driver on the host that the single entity has the error, wherein in response to determining the errors has occurred for the single entity, resending the single entity to the POS printer without locating one or more individual commands in the at least the portion of the plurality of commands that have the one or more errors.

8. The computer-readable medium of claim 7 wherein the payload identifier is provided to the POS printer immediately before or after the single entity is provided to the POS printer, wherein the payload identifier is a logical delimiter marking a start of a first command of the at least the portion of the plurality of commands or marking an end of a last command of the at least the portion of the plurality of commands.

9. The computer-readable medium of claim 7 wherein the instructions further are for deleting the single entity after the performing of the plurality of operations corresponding to the at least the portion of the plurality of commands, the deleting performed without locating each of the commands in the at least the portion of the plurality of commands.

10. The computer-readable medium of claim 7 wherein the instructions further are for:

organizing at least a second portion of the plurality of commands into a second single entity, the at least the second portion of the plurality of commands containing more than one remaining command of the plurality of commands;

providing a second payload identifier corresponding to the second single entity, the payload identifier indicating a correspondence between the at least the second portion of the plurality of commands and the second single entity; and sending the second single entity from the at least one native POS printer driver to the POS printer.

11. The computer-readable medium of claim 7 wherein the payload identifier includes a printer command to be simply echoed by the POS printer.

12. A system for managing complex payload for a printer, the complex payload including a plurality of commands from a Unified POS application running on a host, the system comprising:

at least one printer driver subsystem communicating with a standard host application and providing the plurality of commands;

a POS printer including firmware; and at least one native POS printer driver provided on the host, the at least one native printer driver:

converting on the host the plurality of commands of the complex payload from a Unified POS format to a native POS format used by the POS printer, wherein each of the plurality of the commands is usable as an individual command by the POS printer;

organizing at least a portion of the plurality of commands in the native POS format into a single entity, the at least the portion of the plurality of commands containing more than one of the plurality of commands, providing a payload identifier corresponding to the single entity, the payload identifier indicating a correspondence between the at least the portion of the plurality of commands and the single entity, and wherein the firmware of the POS printer is capable of recognizing the payload identifier as indicating the single entity, sending the single entity from the at least one native POS printer driver to the POS printer, wherein the POS printer is not a Unified POS printer, wherein a plurality of operations are performed by the POS printer corresponding to the at least the portion of the plurality of commands; and tracking the at least the portion of the plurality of commands by only tracking the single entity instead of individually tracking the commands of the at least the portion of plurality of commands, wherein the tracking the single entity includes determining whether the single entity has reached and been processed by the POS printer, as assisted by an indication from the POS printer to the at least one native POS printer driver on the host that the single entity has been received and processed, and determining that an error has occurred for the single entity by determining whether one or more errors have occurred for any of the plurality of commands in the single entity at the POS printer, as assisted by an indication from the POS printer to the at least one native POS printer driver on the host that the single entity has the error, wherein in response to determining the error has occurred for the single entity, resending the single entity to the POS printer without locating one or more individual commands in the at least the portion of the plurality of commands that have the one or more errors.

13. The system of claim 12 wherein the payload identifier is provided to the POS printer immediately before or after the single entity is provided to the POS printer, wherein the payload identifier is a logical delimiter marking a start of a first command of the at least the portion of the plurality of commands or marking an end of a last command of the at least the portion of the plurality of commands.

14. The system of claim 12 wherein the payload identifier further includes an identification for the single entity.

15. The system of claim 12 wherein the at least one native POS printer driver further organizes at least a second portion of the plurality of commands into a second single entity, the at least the second portion of the plurality of commands containing more than one remaining command of the plurality of commands and provides a second payload identifier corresponding to the second single entity, the payload identifier indicating a correspondence between the at least the second portion of the plurality of commands and the second single entity.

16. The system of claim 12 wherein the payload identifier includes a printer command to be echoed by the POS printer.

* * * * *